Patented Sept. 5, 1939

2,172,275

UNITED STATES PATENT OFFICE 2,172,275

ALKALI METAL HYPOSULPHITES

Heinrich Dehnert, Ludwigshafen-on-the-Rhine, Germany, assignor to I. G. Farbenindustrie Aktiengesellschaft, Frankfort - on - the - Main, Germany No Drawing. Application March 12, 1938, Serial No. 195,582. In Germany March 15, 1937

3 Claims. (Cl. 23—116)

The present invention relates to improvements in the production of alkali metal hyposulphites.

It has already been proposed to prepare sodium hyposulphite by the reaction of zinc hyposulphite with caustic soda solution or soda solution.

I have now found that alkali metal hyposulphites can be prepared in an advantageous manner by the reaction of aqueous solutions of heavy metal hyposulphites with alkali metal amalgam. Contrary to expectation, practically no evolution of hydrogen takes place but the heavy metal separates together with a precipitate readily capable of being filtered. The heavy metal is in part dispersed in the aqueous solution, and in part dissolved in the mercury, the ratio being dependent on the nature of the heavy metal and the working conditions. Thus for example in the action of an 0.06 per cent sodium amalgam on zinc hyposulphite solution, the pale grey precipitate dispersed in the aqueous solution contains practically no metallic zinc, whereas when using an amalgam containing more than 0.2 per cent of sodium, zinc metal is also present in the precipitate.

Another part of the heavy metal remains dissolved in the aqueous solution. It is preferably precipitated therefrom by an alkali hydroxide, alkali carbonate, alkali sulphite or by other suitable agents. The two precipitates may be removed consecutively or simultaneously. The aqueous filtrate free from heavy metal contains the alkali metal hyposulphite in a yield of more than 90 per cent of the amount theoretically possible calculated on the heavy metal hyposulphite introduced; it may be worked up to solid salt by one of the known methods.

Among suitable heavy metal hyposulphites there may be mentioned for example zinc, cadmium and iron hyposulphites. Sodium or potassium amalgam may be mentioned as examples of alkali metal amalgams. It is especially advantageous to use the sodium amalgam formed by the electrolysis of common salt with mercury as cathode.

Generally speaking it is preferable to use the alkali metal in a somewhat greater amount than is stoichiometrically necessary. The excess depends on the nature and strength of the hyposulphite solution used and amounts to from about 5 to 15 per cent.

The process may be carried out in batches or also continuously. In the former case, for example sodium amalgam is caused to flow into a zinc hyposulphite solution while stirring, the mercury which contains more or less zinc dissolved therein, is separated, the zinc remaining in the solution is precipitated and the precipitate is filtered off. When working continuously, the amalgam may be led in counter-current to the hyposulphite solution which is flowing for example in a tube or channel. The aqueous solution, with the entrained resulting precipitate, flows continuously through an overflow and the mercury, which may contain unused alkali metal in addition to the heavy metal, through a siphon.

As compared with the known processes for the preparation of sodium hyposulphite by the reaction of zinc hyposulphite solution with caustic soda solution, the process according to this invention has the advantage that the amalgam obtained from the electrolysis of alkali chloride may be directly used and there is no need first to prepare caustic soda solution therefrom. Furthermore the precipitate produced by the amalgam and the precipitate formed by the precipitation of the heavy metal still present in the aqueous solution are more readily capable of being filtered than when the whole of the heavy metal is precipitated from the hyposulphite with soda solution or caustic soda solution. In this way a shortening of the time of washing is obtained. Furthermore it is possible to prepare sodium hyposulphite solutions which are considerably stronger than the solutions hitherto obtainable directly, the solutions containing for example more than 200 grams per liter, because no dilution of the aqueous solution is caused by the amalgam, whereas the precipitation of zinc with caustic soda solution or soda solution always leads to a considerable dilution.

The heavy metal set free by the reaction of the hyposulphite with the amalgam, especially so far as it is present as amalgam, may be used again for the preparation of hyposulphite, as for example in known manner by reaction with sodium bisulphite. In the preparation of sodium hyposulphite by the reaction of zinc hyposulphite with caustic soda or soda solution, a direct re-employment of the resulting zinc compound is, however, impossible.

The following example will further illustrate how the said invention may be carried out in practice, but the invention is not restricted thereto.

*Example*

34 kilograms of an amalgam containing 74.5 grams of sodium are caused to flow rapidly in an atmosphere of nitrogen into each liter of a solution containing 315 grams of zinc hyposulphite per liter while stirring. The temperature is kept at about 35° centigrade by cooling. After adding the amalgam the whole is stirred for from 1 to 2 minutes and the mercury, which now only contains 5.5 grams of sodium, is separated. Into the aqueous liquid containing a black precipitate there are then stirred 250 cubic centimeters of 12 per cent sodium carbonate solution, the black precipitate being filtered off and washed with 250 cubic centimeters of water. The water-clear filtrate is free from zinc and contains 258 grams of sodium hyposulphite, i. e., 91 per cent of the theoretical amount calculated with reference to the zinc hyposulphite used or 98.9 per cent calculated with reference to the sodium reacted. The aqueous solution may be worked up to solid sodium hyposulphite by one of the known methods.

What I claim is:

1. The process of producing alkali metal hyposulphites which consists in reacting heavy metal hyposulphites with alkali amalgam.

2. The process of producing alkali metal hyposulphites which consists in reacting a hyposulphite selected from the group which consists of zinc hyposulphite, cadmium hyposulphite and iron hyposulphite, with alkali amalgam.

3. The process of producing alkali metal hyposulphites which consists in reacting zinc hyposulphite with alkali metal amalgam to form alkali metal hyposulphite and zinc amalgam, converting the latter into zinc hyposulphite and reconverting the mercury to amalgam.

HEINRICH DEHNERT.